DE WITT C. WORSHAM & W. VANDEVENDER.
FEED TROUGH.
APPLICATION FILED JAN. 27, 1909.

993,630.

Patented May 30, 1911.

Witnesses

Inventors
De Witt C. Worsham
William Vandevender.
By
Attorneys

DE WITT C. WORSHAM & W. VANDEVENDER.
FEED TROUGH.
APPLICATION FILED JAN. 27, 1909.

993,630.

Patented May 30, 1911.
2 SHEETS—SHEET 2.

Witnesses

Inventor
De Witt C. Worsham.
William Vandevender.
By
Attorneys

UNITED STATES PATENT OFFICE.

DE WITT C. WORSHAM AND WILLIAM VANDEVENDER, OF TERRE HAUTE, INDIANA.

FEED-TROUGH.

993,830. Specification of Letters Patent. Patented May 30, 1911.

Application filed January 27, 1909. Serial No. 474,573.

*To all whom it may concern:*

Be it known that we, DE WITT C. WORSHAM and WILLIAM VANDEVENDER, citizens of the United States, residing at Terre Haute, in the county of Vigo, State of Indiana, have invented certain new and useful Improvements in Feed-Troughs; and we do hereby declare the following to be a full, clear, and exact description of the invention, such as will enable others skilled in the art to which it appertains to make and use the same.

The invention relates to feeders and more particularly to the class of feed troughs for stock, poultry and the like.

The primary object of the invention is the provision of a feed trough in which feed is held in separate compartments and is properly fed to a tray or trough where it is accessible to stock or poultry, and a water receptacle adapted to deliver water to the trough to enable the stock or poultry to drink the same.

Another object of the invention is the provision of a feed trough for stock or poultry in which a quantity of feed is held and gradually delivered into spaces separated by dividing webs or walls where the said feed is accessible to the stock or poultry, and a removable water receptacle arranged within the feed trough so as to supply water to one of said spaces for drinking purposes.

A further object of the invention is the provision of a feed trough for stock or poultry which is simple in construction, thoroughly efficient in operation, durable and inexpensive in the manufacture.

With these and other objects in view as will more fully hereinafter appear the invention consists in the construction, combination and arrangement of parts hereinafter fully described, illustrated in the accompanying drawings which disclose the preferred form of embodiment of the invention and particularly pointed out in the claim hereunto appended.

It is to be understood that minor changes, variations and modifications may be made without departing from the spirit or sacrificing any of the advantages of the invention.

Figure 1:
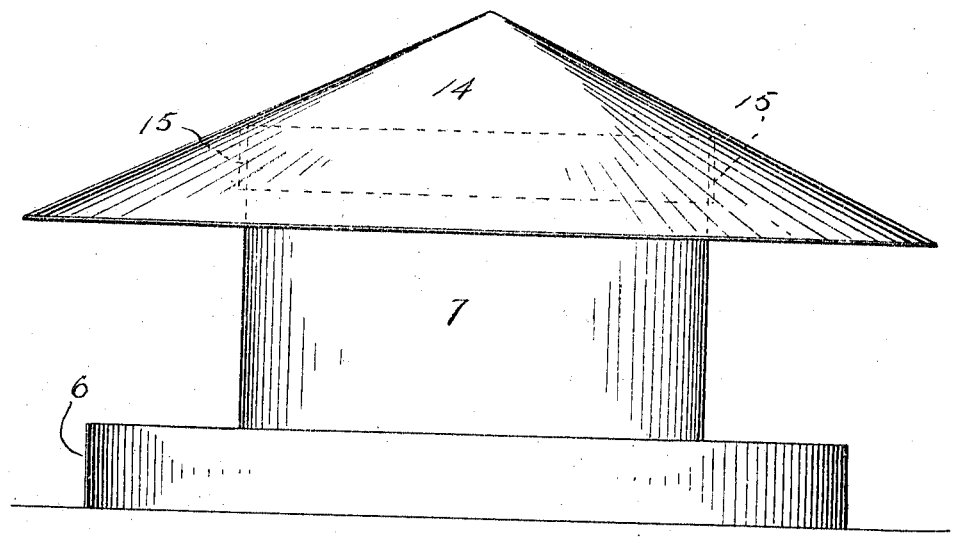
Figure 2:
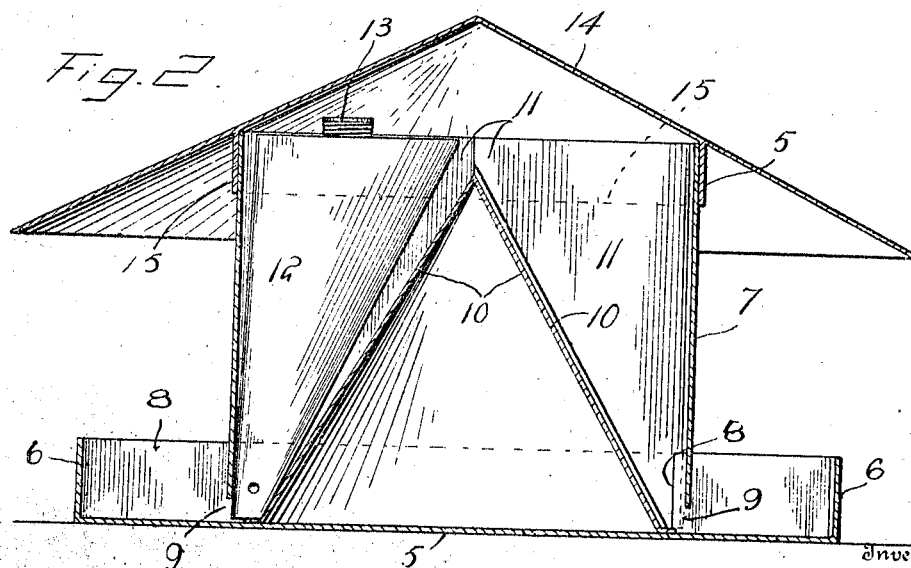
Figure 3:
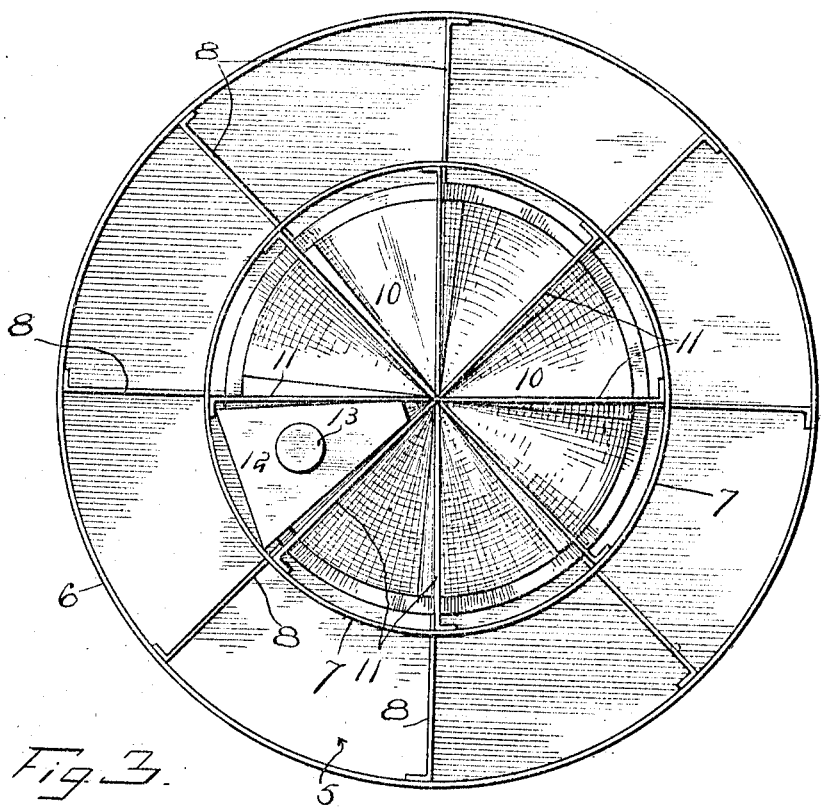
Figure 4:
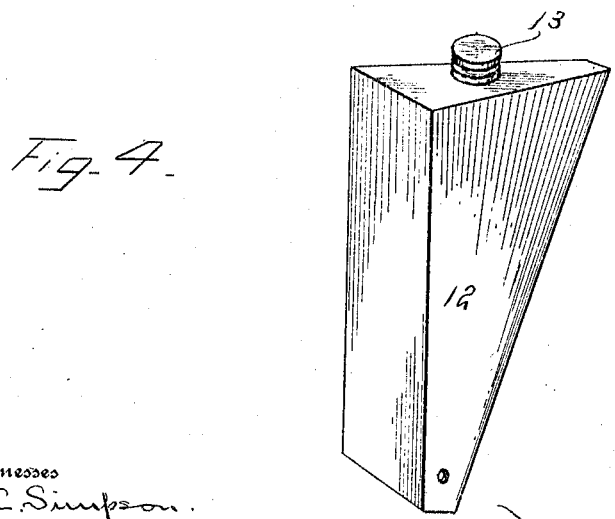

In the drawings: Figure 1 is a side elevation of the invention. Fig. 2 is a vertical sectional view. Fig. 3 is a top plan view with the top removed. Fig. 4 is a detail perspective view of the removable water receptacle.

Similar reference characters indicate corresponding parts throughout the several views in the drawings.

In the drawings the numeral 5 designates a base preferably formed of metal or other suitable material and preferably circular in marginal contour and from the periphery of this base rises a vertical annular wall 6 either formed integral therewith or otherwise secured to the base. The height of this trough wall 6 varies in proportion to the size of the feeder used, it being obvious that larger feeders may be used for stock than for poultry.

Secured to the upper face of the base is a cylindrical feed tank or hopper 7 considerably less in exterior diameter than the base and projecting a considerable distance beyond the upper edge of the vertical wall 6 of said base. With this construction it is obvious that an annular space will be formed by the outer wall of the feed tank or hopper and the inner face of the vertical wall, the space constituting the trough proper and adapted to hold grain and the like.

Suitably secured to the vertical wall 6 and the hopper 7 and disposed radially at intervals apart in the space between the same are vertical webs or partitions 8 so as to form separated and independent grain spaces between the partitions. Communication is established between the interior of the hopper 7 and the separated or independent spaces in the trough between the partitions 8 by means of oblong openings or ports 9 extending upwardly from the base 5 to a point removed from the plane of the upper edge of the vertical wall 6 of the trough.

Within the hopper 7 and secured to the base 5 is a conical wall 10 which forms a bottom for the said hopper and serves as an inclined floor for the latter. The hopper is subdivided into a plurality of compartments by radially disposed vertical walls 11 which latter are in alinement with the webs or partitions 8 so that feed introduced into the compartments will be discharged through the ports 9 into the separated or independent spaces between the said webs or partitions 8 into the trough.

It will be readily seen how different kinds of grain may be supplied by the hopper at one time, the function of the latter being to keep the trough filled with grain which enters through the ports 9 formed in the lowermost portion of the said hopper. Removably fitted in one of the compartments within the hopper and correspondingly shaped thereto is a water receptacle 12 the latter having at its top a removable screw cap 13 to permit the filling of the receptacle when removed through a suitable opening covered by said cap. The lowermost portion of the receptacle 12 when fitted within one of the compartments in the hopper has its bottom removed a slight distance from the base 5 and this receptacle is provided with discharge openings to permit the delivery of water therefrom into one of the spaces between the partitions 8 in the trough so that it can be filled with water for drinking purposes by the stock or poultry.

Detachably mounted upon the hopper 7 is a cover or top 14 of conical shape and is adapted to overhang the trough and this top or cover has a depending annular flange 15 engaging and circumscribing the upper edge of the hopper so as to form an air tight closure therefor. It is obvious by having the cover so constructed to overhang the feed trough, rain will be excluded from the said trough thus preventing damage to the food therein during inclement weather.

What is claimed is—

A stock feeder comprising a circular trough having an upstanding flange, a conical member inserted on the trough and formed with a circumscribing flange secured to the trough centrally thereof, a cylindrical hopper of greater diameter than the flange of the conical member located centrally of the trough and surrounding said flange, said hopper being formed with discharge openings located near the bottom thereof, a series of partitions having right angular outer ends secured to the flange of the trough and extending inwardly toward the center thereof and through the cylindrical hopper, said partitions serving to hold the hopper in fixed relation to the trough, a series of triangular partitions located between the hopper and the conical member and radiating from said conical member, said last partitions having right angular outer ends secured thereby to the hopper, a water vessel disposed between the conical member and the cylindrical hopper, and a conical hood having a depending flange secured on the upper edge of the hopper.

In testimony whereof, we affix our signatures, in presence of two witnesses.

DE WITT C. WORSHAM.
WILLIAM VANDEVENDER

Witnesses:
CLAUD B. CHAPPELL,
WILBER S. CHAPPELLE.